Dec. 4, 1962 H. H. WALLER 3,067,342
MONOSTABLE MULTIVIBRATOR WITH EMITTER FOLLOWER IN FEEDBACK PATH FOR RAPID DISCHARGING OF ISOLATED TIMING CAPACITOR
Filed Oct. 6, 1960
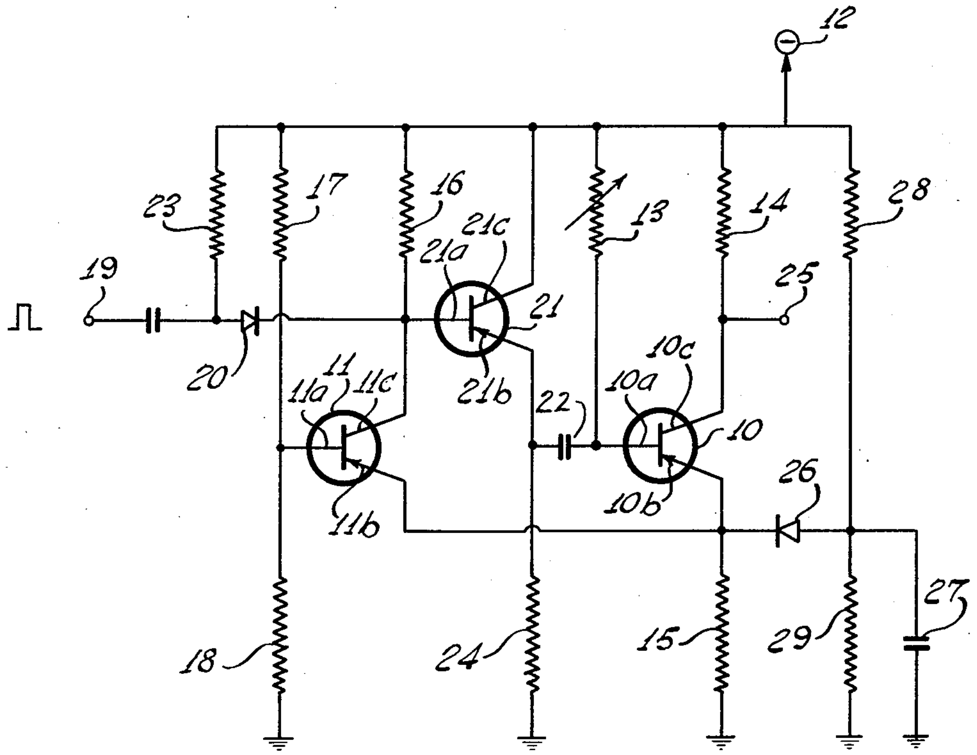
INVENTOR
HERBERT H. WALLER
BY Roy C. Hopgood
ATTORNEY United States Patent Office 3,067,342

Patented Dec. 4, 1962

3,067,342

MONOSTABLE MULTIVIBRATOR WITH EMITTER FOLLOWER IN FEEDBACK PATH FOR RAPID DISCHARGING OF ISOLATED TIMING CAPACITOR

Herbert H. Waller, Hicksville, N. Y., assignor to Servo Corporation of America, Hicksville, N.Y., a corporation of New York Filed Oct. 6, 1960, Ser. No. 60,925
7 Claims. (Cl. 307—88.5)

This invention relates to a pulse transmission control circuit and, more specifically, to a monostable multivibrator circuit utilized in controlling the passage of information pulses.

Monostable multivibrator circuits, i.e., circuits having one stable state and one unstable state, are utilized in data transmission systems to control the passage of synchronizing pulses at predetermined time intervals to the receiving circuits of the system. The synchronizing pulses are transmitted at a predetermined repetition rate and, as is well known, noise impulses occur between them.

The multivibrator, which normally operates in its stable state, "flips" to its unstable state when a first synchronizing pulse is detected and "flops" back to its stable state just prior to the time of arrival of the next succeeding synchronizing pulse; the time constants of the multivibrator circuit are selected to control the switching of the circuit in time coincidence with the pulse repetition rate of the synchronizing pulses. As the circuit "flops" back to its stable state, it generates a gate waveform which is applied to appropriate circuitry permitting the synchronizing pulse to be passed to the receiving circuits. Due to a relatively long finite time required to recharge the multivibrator circuit components after "flopping", the conventional circuit is not capable of immediately detecting the next synchronizing pulse and, therefore of being "flipped" to its unstable state. This prevents the circuit from operating in time coincidence with the synchronizing pulses, and an accurate gate waveform cannot be generated to permit the passage of the pulse.

Accordingly, it is an object of the invention to provide a monostable multivibrator for use in a data transmission system which accurately gates the passage of synchronizing pulses to the receiving circuits of the system in time coincidence with the repetition rate of the pulses.

It is another object of the invention to provide a monostable multivibrator circuit which protects the receiving circuits of a data transmission system from erroneously detecting noise impulses.

A further object is to provide an arrangement in a monostable multivibrator circuit for achieving almost instantaneous reinitiation of the unstable state of circuit operation.

Still a further object is to provide an arrangement in a monostable multivibrator circuit for reducing the finite time normally required to recharge the components of the circuit after it has "flopped" back to its stable state of operation.

In accordance with an aspect of the invention, there is provided a circuit for generating a waveform in response to pulses having a predetermined repetition rate. The circuit comprises a gate to which the pulses are applied, and a monostable multivibrator which controls the opening or blocking of the gate dependent on whether the circuit is operating in its stable or unstable state, respectively. A time constant circuit, having a charging device, is provided to control the switching time of the circuit from the unstable state to the stable state in time coincidence with the repetition rate of the pulses. A second time constant circuit is provided, including the charging device of the first time constant circuit, which is coupled to the gate to provide the bias for blocking the gate. Means for shunting the resistive component of the second time constant circuit are also provided to rapidly discharge the charging device, immediately after the circuit has been switched to its stable state.

The above-mentioned and other features and objects of this invention and the manner of attaining them will become more apparent and the invention itself will be best understood by reference to the following description of an embodiment of the invention taken in conjunction with the accompanying drawing, wherein a monostable multivibrator circuit having an arrangement for achieving the early reinitiation of the unstable state of operation is shown.

Referring now to the drawing, the novel multivibrator comprises transistors 10—11, having base, emitter and collector electrodes 10*a*—10*c* and 11*a*—11*c*, respectively. The transistors illustrated are of the PNP type which conduct, as is well known in the art, when the collector electrode is more negative than the base electrode and the base electrode is more negative than the emitter electrode. Obviously, NPN transistors may also be employed with the usual changes in biasing circuitry.

In the stable operating condition of the circuit, the transistor 10 conducts. The base and collector electrodes 10*a* and 10*c* of this transistor are coupled to a negative power supply 12 through the resistors 13—14, respectively, and the emitter electrode 10*b* is ground connected through a resistor 15. The voltage drop across resistor 13, although variable, is greater than the drop across resistor 14 causing the transistor 10 to conduct.

Similarly, the base and collector electrodes 11*a* and 11*c* of transistor 11 are energized from the supply 12 through a voltage divider 17—18 and a resistor 16, respectively. Emitter electrode 11*b* is ground connected through the common emitter resistor 15. During the stable operating condition of the circuit, when transistor 10 is conducting, a bias voltage is developed across resistor 15 which is applied to the base to emitter junction of transistor 11 to render it non-conductive. The transistor 11 remains non-conductive until the multivibrator is switched to its unstable operating condition in a manner to be described hereinafter.

The synchronizing pulses, which are assumed to have a positive polarity for illustrative purposes, are applied to the multivibrator circuit at the input terminal 19 at a predetermined repetition rate. Pulses corresponding to the applied pulses are coupled to the base electrode 10*a* of transistor 10 through a gating device, such as the diode 20, through the base and emitter electrodes 21*a* and 21*b* of a PNP transistor 21 and a capacitor 22 which couples transistors 10 and 21. The collector electrode 21*c* of the transistor 21 is connected directly to the supply 12; the base electrode 21*a* is coupled to supply 12 through a resistor 16; and, the emitter electrode 21*b* is ground connected through a resistor 24, so that, during the stable operating condition of the circuit, the transistor 21 is conducting. In addition, the gating diode 20 is biased for conduction through the resistors 16 and 23 and, therefore, is open, to pass a pulse applied at the input terminal 19 to the capacitor 22.

As previously stated, it is an object of the invention to close the gate during the periods between synchronizing pulses to prevent the passage of noise to the receiving circuits of the data system. This is accomplished while transistor 10 is conducting and the circuit is in its stable operating condition; the pulse resulting from the synchronizing pulse is applied to the capacitor 22 causing it to discharge, thereby leaving the base electrode 10*a* more positive than the emitter electrode 10*b*. Conduction ceases in transistor 10 and the circuit "flips" to its unstable operating state due to the decrease in the bias voltage developed across the resistor 15.

In the unstable operating state of the multivibrator circuit, the transistor 11 conducts and produces a positive output voltage at its collector electrode 11*c*. This voltage is applied to the base electrode 21*a* of transistor 21 to render it non-conductive. It is also developed across resistor 16 back-biasing the diode 20 to close the gate by making the cathode more positive than the anode.

Transistor 11 continues to conduct, back-biasing the diode 20 to prevent any pulses from being passed to the multivibrator circuit, for a period of time which depends on the time constant of the charging circuit for the capacitor 22. Capacitor 22 is charged from the supply 12 through the resistor 13 and the resistor 24 to ground. The time required to charge the capacitor 22 controls the switching time from the unstable condition to the stable condition. It is chosen to be approximately equal to but not greater than the spacing between the synchronizing pulses applied at the input terminal 19.

When the capacitor 22 is negatively charged to cause transistor 10 to assume conduction, the multivibrator circuit "flops" back to the stable condition. As the circuit "flops," a gate waveform corresponding to the synchronizing pulse is generated at the output terminal 25 which is applied to the appropriate circuitry.

The conventional monostable multivibrator circuit, which does not include the transistor 21 and the resistor 24, is not capable of being "flipped" to the unstable condition for a finite period of time, which is not quick enough to permit the transistor 10 to receive the next succeeding synchronizing pulse, after the multivibrator has "flopped." This period of time depends on the time required to discharge the timing capacitor 22. The discharging circuit for the capacitor 22, in a conventional multivibrator circuit, extends from the supply 12 through the resistor 16 to the capacitor 22 (in the conventional circuit the resistor 16 is connected directly to the capacitor 22). The circuit is completed from capacitor 22 through the base and emitter electrodes 10*a* and 10*b* of transistor 10 and the resistor 15 to ground. Since the discharging impedance through this path is relatively high, the capacitor 22 continues to be residually charged preventing the transistor 10 from receiving the next succeeding synchronizing pulse. This residual charge on the capacitor 22 also continues to back-bias the diode 20 after the circuit has "flopped" to keep the gate in a closed condition.

The multivibrator circuit of the invention alleviates this condition and prepares the transistor 10 for the immediate reception of a pulse, by effectively short-circuiting the resistive components of the discharging circuit. This is accomplished, in connection with the resistor 16, by utilizing the transistor 21 as an amplifier in shunt with the resistor during the stable condition of the circuit. The transistor amplifier 21, which has a gain greater than one, lowers the impedance of the discharging circuit by the gain of the amplifier to charge the capacitor 22 in a shorter period of time. The impedance of the discharging circuit is also reduced by shunting the resistor 15. This is accomplished by connecting a diode 26 and a capacitor 27 between the emitter electrode 10*b* of transistor 10 and ground. A voltage divider 28—29 is connected across the diode 26 and capacitor 27, between the supply 12 and ground to develop a negative bias at the anode of diode 26. The capacitance value of the capacitor 27 is much greater than that of the capacitor 22, so that the diode 26 is effectively grounded at the switching frequency. Thus, the resistor 15 is by-passed during the discharging period of circuit operation.

While the foregoing description sets forth the principles of the invention in connection with specific apparatus, it is to be understood that this description is made only by way of example and not as a limitation of the scope of the invention as set forth in the objects thereof and in the accompanying claims. For example, the capacitor 27 may be eliminated from the by-pass circuit of resistor 15 if the values of the resistors 28 and 29 are low enough to provide a negative bias at the anode of diode 26 which is sufficient to ground the diode. In addition, this by-pass circuit may be coupled to the base electrode 10*a* of transistor 10 rather than to the emitter electrode 10*b*.

What is claimed is:

1. A circuit for generating a waveform in response to pulses of a predetermined repetition rate, comprising a gate, means for applying said pulses to said gate, monostable multivibrator means coupled to said gate and capable of opening and blocking said gate depending on whether the multivibrator is in its stable or unstable condition respectively, said pulse being capable of driving said multivibrator to its unstable condition, a first time constant circuit having a charging device and coupled to said multivibrator for determining the switching time thereof from the unstable to the stable condition, said switching time being approximately equal to but not greater than the spacing between said pulses, whereby in response to a pulse said gate is blocked until the occurrence of the next succeeding pulse, a second time constant circuit including said charging device common to said first time constant circuit, said charging device being coupled to said gate and being charged while said multivibrator is in the unstable condition, which charge constitutes a blocking bias on said gate immediately after said multivibrator is switched to its stable condition; and means for rapidly discharging said charging device, comprising shunting means coupled across and having substantially lower resistance than said second time constant circuit and and operative only in response to the stable condition of said multivibrator.

2. The circuit according to claim 1, wherein said shunting means includes an amplifier having a gain greater than one.

3. The circuit according to claim 2, wherein said multivibrator means includes a power supply, and first and second electron discharge devices having input, output and control electrodes; said second time constant circuit comprises a first resistor shunted by said amplifier and coupled to said supply, said first discharge device, said charging device coupled between said first resistor and the control electrode of said first discharge device, and a second resistor coupled between the input electrode of said first discharge device and ground; and said second time constant circuit also comprises means for by-passing said second resistor, said means comprising a grounded capacitor, a diode coupled to said first discharge device and said capacitor, and a voltage divider connected across said diode and capacitor from said supply to ground.

4. The circuit according to claim 3, wherein said first time constant circuit comprises said charging device, a first resistor connected to said supply and said charging device, and a second resistor connected between ground and said charging device.

5. The circuit according to claim 4, wherein said first resistor of said second time constant circuit is also coupled between said supply, said gate, and the output electrode of said second discharge device, said supply providing a voltage having a polarity opposite to that of the blocking bias charge, whereby when said second discharge device is operative, said bias charge is developed across said first resistor to close said gate.

6. A circuit for generating a waveform in response to pulses of a predetermined repetition rate, comprising a gate, means for applying said pulses to said gate, monostable multivibrator means coupled to said gate and capable of opening and blocking said gate depending on whether the multivibrator is in its stable or unstable condition respectively, said pulse being capable of driving said multivibrator to its unstable condition, said multivibrator including two transistors having base, emitter and collector terminals, one of said terminals of a first transistor being coupled to the respective terminal of the other transistor to control the conducting status of said other transistor, a charging capacitor coupled to the input terminal of the first transistor, said input terminal and other terminals being the base and the collector or emitter, biasing resistors coupled to the base, collector and emitter terminals of said first transistor, and shunting means for said resistors including an emitter follower coupled from the output of said other transistor to the other side of said capacitor.

7. A circuit for generating a waveform in response to pulses of a predetermined repetition rate, comprising a gate, means for applying said pulses to said gate, monostable multivibrator means coupled to said gate and capable of opening and blocking said gate depending on whether the multivibrator is in its stable or unstable condition respectively, said pulse being capable of driving said multivibrator to its unstable condition, said multivibrator including two transistors having base, emitter and collector terminals, one of said terminals of a first transistor being coupled to the respective terminal of the other transistor to control the conducting status of said other transistor, a charging capacitor coupled to the input terminal of the first transistor, said input terminal and other terminals being the base and the collector or emitter, biasing resistors coupled to the base, collector and emitter terminals of said first transistor, and shunting means for said resistors including an emitter follower coupled from the output of said other transistor to the other side of said capacitor, said shunting means further including a capacitor coupled across one of said resistors having a capacitance which is large compared to said charging capacitor.

References Cited in the file of this patent

UNITED STATES PATENTS

| | | |
|---|---|---|
| 2,784,309 | Sable | Mar. 5, 1957 |
| 2,834,880 | Clapper | May 13, 1958 |